(12) United States Patent
Naik et al.

(10) Patent No.: US 7,534,021 B2
(45) Date of Patent: May 19, 2009

(54) BUMPER ASSEMBLY WITH FOG LAMP BEZEL

(75) Inventors: Umesh Naik, Ann Arbor, MI (US); Randy S. Hodder, Brighton, MI (US); James Castro, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/672,273

(22) Filed: Feb. 7, 2007

(65) Prior Publication Data

US 2007/0182175 A1    Aug. 9, 2007

Related U.S. Application Data

(60) Provisional application No. 60/765,935, filed on Feb. 7, 2006.

(51) Int. Cl.
*B60Q 1/02* (2006.01)
(52) U.S. Cl. .................. 362/549; 362/546; 296/117
(58) Field of Classification Search .............. 293/117; 362/505, 546, 549
See application file for complete search history.

(56) References Cited

U.S. PATENT DOCUMENTS

| | | | | |
|---|---|---|---|---|
| 3,794,278 A | * | 2/1974 | Frey et al. | 248/27.3 |
| 3,998,178 A | * | 12/1976 | Dutot et al. | 116/28 R |
| 4,387,920 A | * | 6/1983 | Slaughter et al. | 362/505 |
| 6,203,366 B1 | * | 3/2001 | Muller et al. | 439/561 |
| 6,318,774 B1 | | 11/2001 | Karr et al. | |
| 6,347,881 B1 | * | 2/2002 | Serizawa et al. | 362/546 |
| 6,572,161 B2 | | 6/2003 | Wild et al. | |
| 6,776,514 B2 | * | 8/2004 | Murakami | 362/509 |
| 6,902,215 B1 | * | 6/2005 | Condeelis | 293/117 |

FOREIGN PATENT DOCUMENTS

JP          06270736          9/1994
JP     2000326806 A    *  11/2000

OTHER PUBLICATIONS

JP2000326806 Abstract from EPO website.*

* cited by examiner

*Primary Examiner*—H Gutman
*Assistant Examiner*—Melissa A Black
(74) *Attorney, Agent, or Firm*—Gifford, Krass, Sprinkle, Anderson & Citkowski, P.C.

(57) ABSTRACT

A bumper assembly that includes a molded bumper fascia and a molded cover/bezel mounted in an opening in the bumper. The bezel/cover is adapted to contain a fog lamp and is accurately positioned within the opening of the bumper fascia to avoid motion along the longitudinal axis of the opening, both in the forward and reverse directions, by external ribs on the cover/bezel that engage edges of the bumper to act as detents. Living hinges may be integrally molded with the bumper fascia to provide a mechanical fixation to the cover/bezel after the cover/bezel is installed in the opening and the hinges are bent from their mold positions.

12 Claims, 6 Drawing Sheets

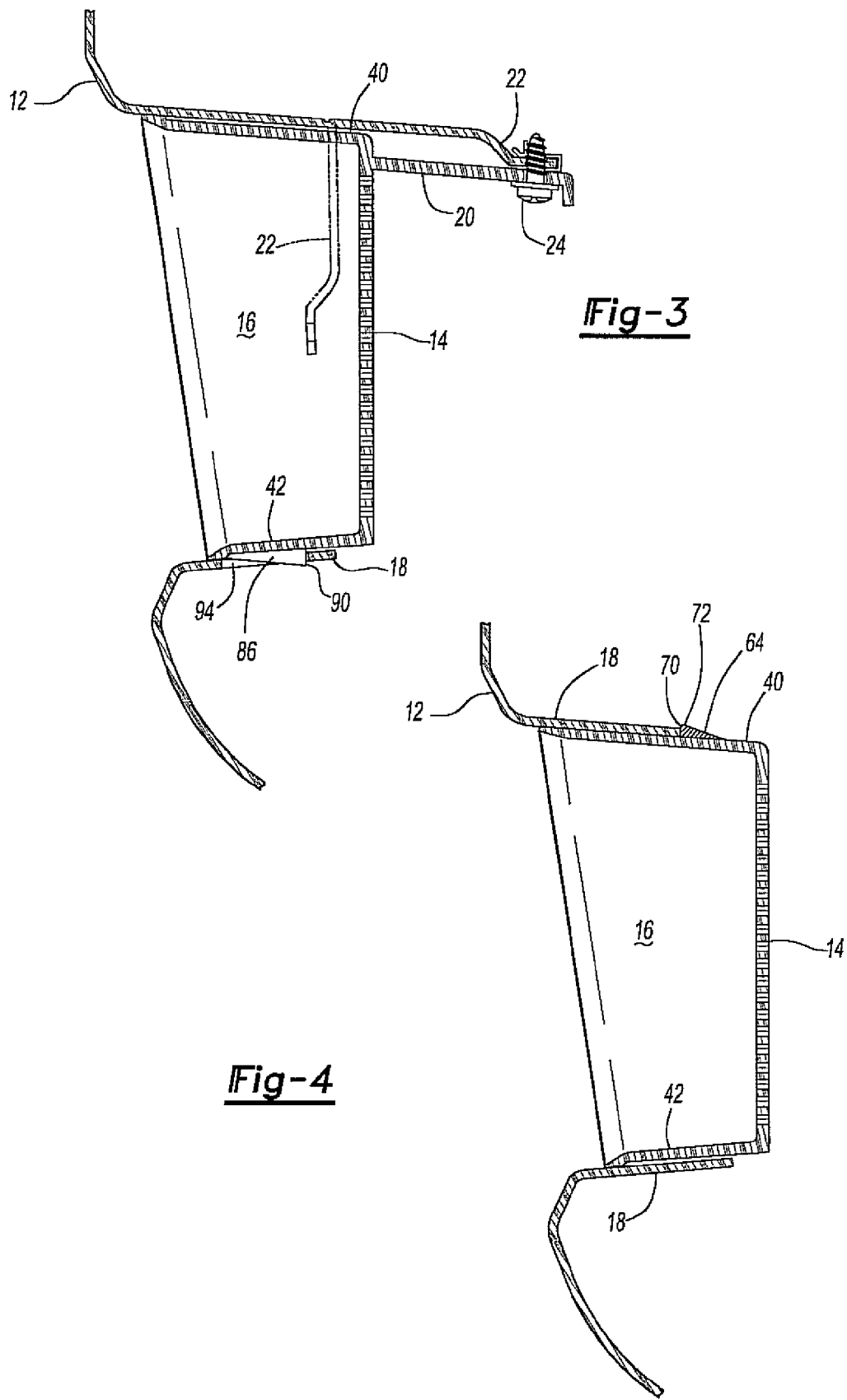

BUMPER ASSEMBLY WITH FOG LAMP BEZEL

RELATED APPLICATION

This application claims priority of U.S. Provisional Patent Application Ser. No. 60/765,935 filed Feb. 7, 2006, which is incorporated herein by reference.

FIELD OF THE INVENTION

This invention relates to an automotive bumper fascia with a bezel that is adapted to hold a fog lamp, the bezel being accurately positioned in the bumper. The bezel serves as a cover when no fog lamp is inserted therein.

BACKGROUND OF THE INVENTION

Japanese Patent Abstract JP 06270736 discloses a bumper assembly that has a fog lamp bezel mounted therein. The arrangement of this reference uses an outer flange to prevent movement of the fog lamp bezel in a longitudinal direction and a flexible arm and detent to engage the bumper to prevent the bezel from movement in an opposite direction into the bumper.

SUMMARY OF THE INVENTION

In the arrangement of the present invention, a bumper fascia and a bezel are coupled together by a plurality of snap detents and/or living hinge tabs to prevent movement in a longitudinal direction. Rib standoffs are provided to prevent rotation of the bezel housing within the bumper assembly that includes the bumper fascia and the bezel.

BRIEF DESCRIPTION OF THE DRAWINGS

FIG. 3 is a sectional view taken on line 3-3 of FIG. 1;

FIG. 4 is a sectional view taken on line 4-4 of FIG. 1;

DETAILED DESCRIPTION OF THE INVENTION

Figure 1:
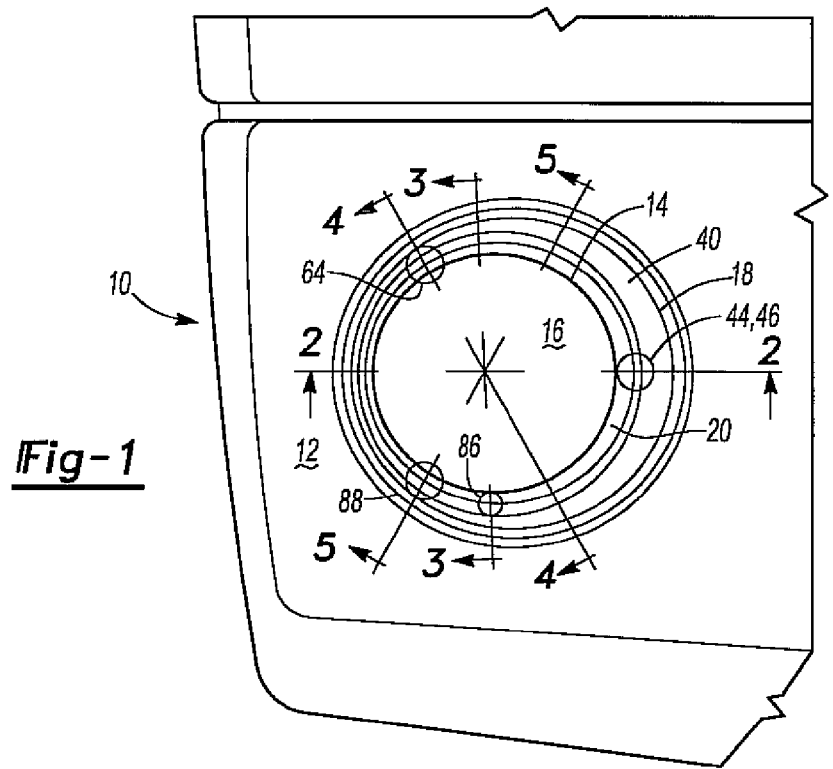
FIG. 1 is a fragmentary elevational view of a bumper assembly with a bezel that is adapted to contain a fog lamp, the bezel being mounted in the bumper assembly according to an embodiment of the present invention.

Referring to FIG. 1, a bumper fascia 10 has an outer wall 12 with an opening 16 for receiving a bezel 40, the bezel 40 being adapted to have a fog lamp (not shown) inserted therein. The bezel 40 has a transversely extending wall 14 to close it off for applications where no fog lamp is to be inserted therein. The cross-sections indicated at section lines 2-2, 3-3, 4-4 and 5-5 are illustrated in FIGS. 2, 3, 4 and 5, respectively. The opening 16 is surrounded by a bumper wall 18 so as to define the opening 16. The bumper wall 18 extends in a longitudinal direction relative to the bumper fascia 10, such that the bumper wall 18 extends in a direction generally opposite the outer wall 12 of the bumper fascia 10. The bumper fascia 10 is of molded plastic construction to provide satisfactory yieldability at an acceptable cost.

Figure 2:
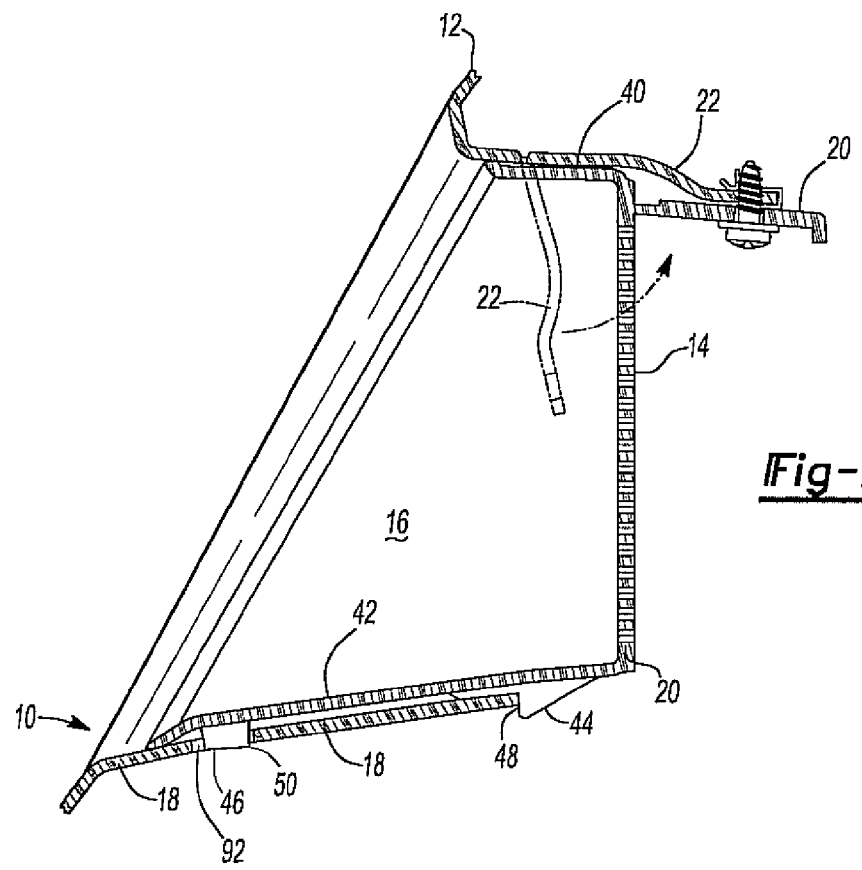
FIG. 2 is a sectional view taken on line 2-2 of FIG. 1.
Figure 10:
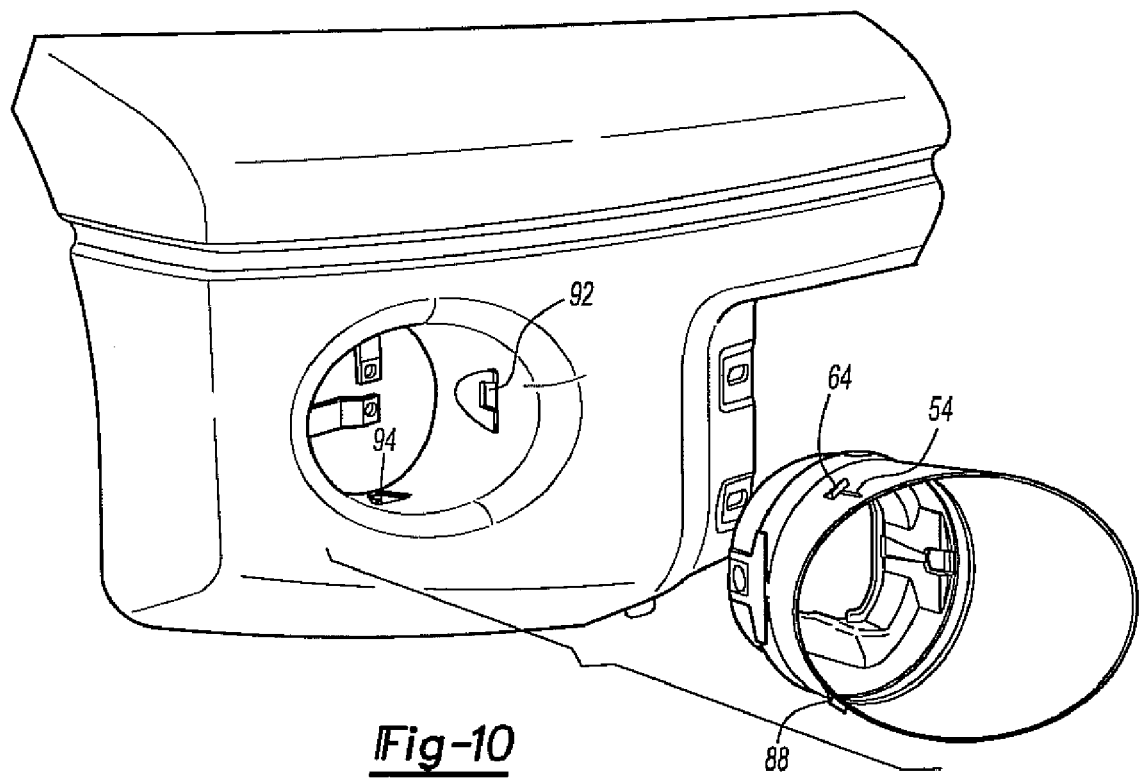
FIG. 10 is an exploded front perspective view illustrating the bezel relative to the bumper assembly according to an embodiment of the present invention.
Figure 11:
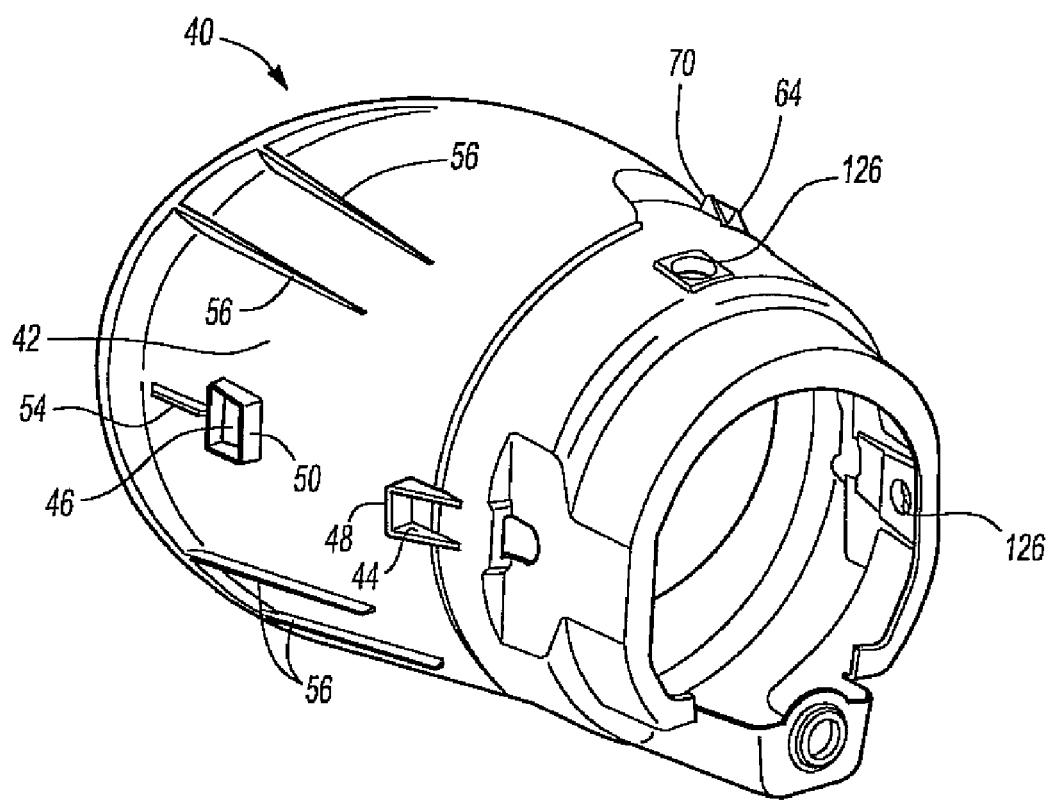
FIG. 11 is a rear perspective view illustrating the bezel according to an embodiment of the present invention.

The bezel 40 is contained within the bumper fascia 10 in the fore-aft or longitudinal direction by detents. As shown in FIGS. 1, 2 and 11 a first detent is formed by a first pair of tabs 44, 46, which extend outwardly from an outer surface of the bezel wall 42. The first pair of tabs 44, 46 include opposing and spaced apart locating edges 48 and 50, respectively. The locating edge 48 engages a peripheral edge of the bumper wall 18 to contain the bezel 40 in the longitudinal direction, so as to prevent the bezel 40 from moving outward relative to the bumper fascia 10. Tab 46 corresponds to aperture 92 disposed in the bumper wall 18, as seen in FIG. 10, and locating edge 50 engages a peripheral edge of aperture 92 to contain the bezel 40 in the longitudinal direction, so as to prevent the bezel 40 from moving inward relative to the bumper fascia 10.

As seen in FIG. 11, tuning ribs 54, 56 are formed integral with the bezel wall 42, for positioning the bezel 40 within opening 16 in a direction substantially perpendicular to the longitudinal direction. The tuning fibs 54 and 56 can be lengthened or shortened to accommodate assembly tolerances.

As shown in FIGS. 1, 4, 10 and 11, a second detent is formed by a second tab 64 that extends outwardly from the outer surface of the bezel wall 42. The second tab 64 includes a locating edge 70. The locating edge 70 of the second tab 64 engages the peripheral edge of the bumper wall 18 to constrain the bezel 40 in the longitudinal direction, so as to prevent the bezel 40 from moving outward relative to the bumper fascia 10.

Figure 5:
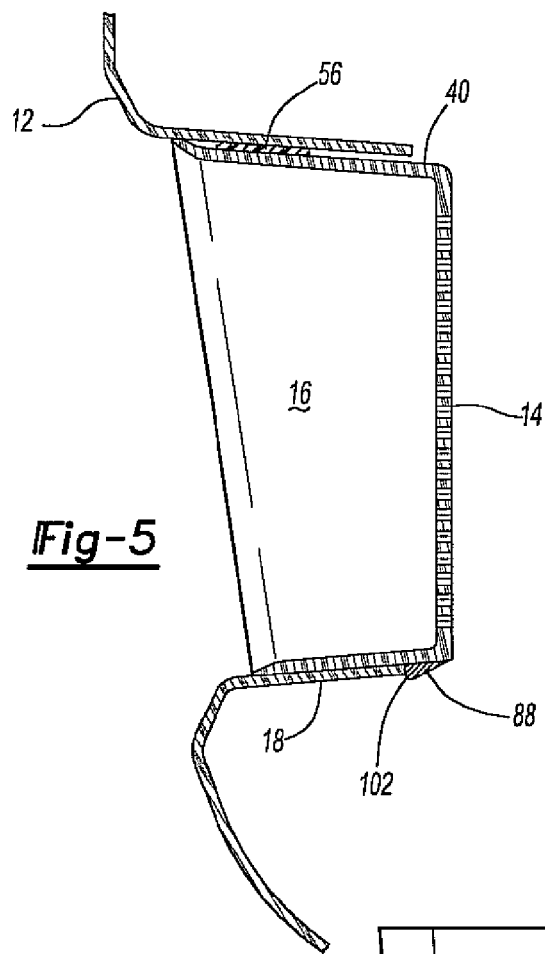
FIG. 5 is a sectional view taken on line 5-5 of FIG. 1.
Figure 6:
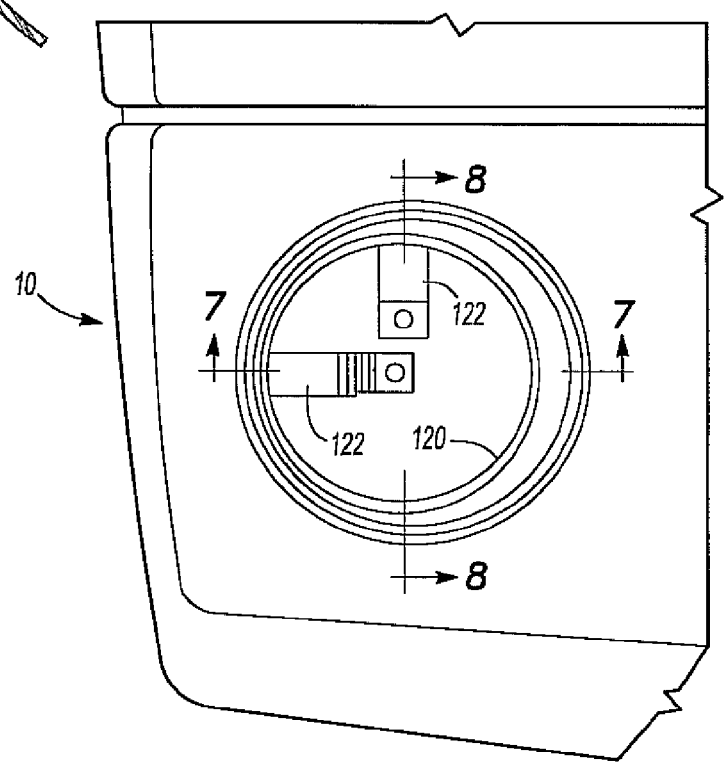
FIG. 6 is a view like FIG. 1 of an alternative embodiment of the present invention.
Figure 7:
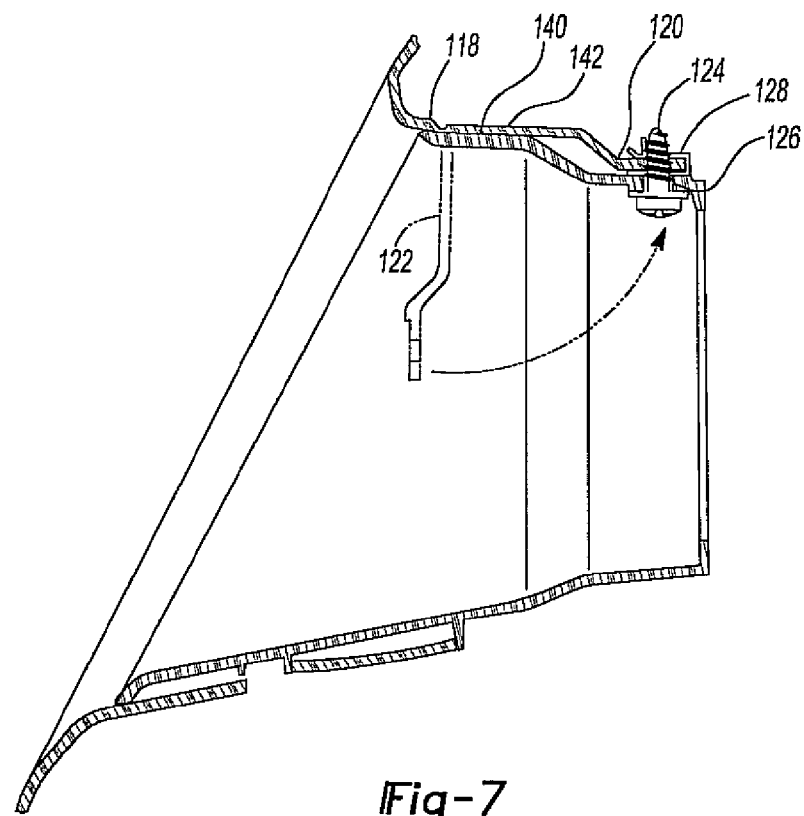
FIG. 7 is a sectional view taken alone line 7-7 of FIG. 6.
Figure 8:
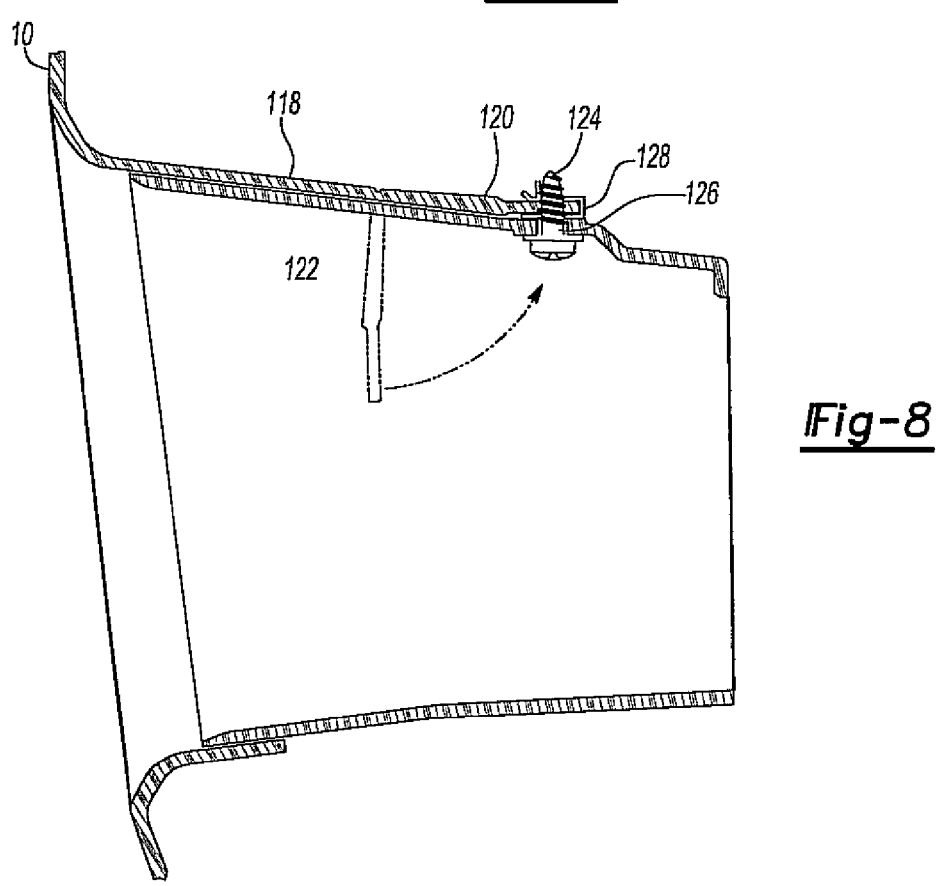
FIG. 8 is a sectional view taken along line 8-8 of FIG. 6.
Figure 9:
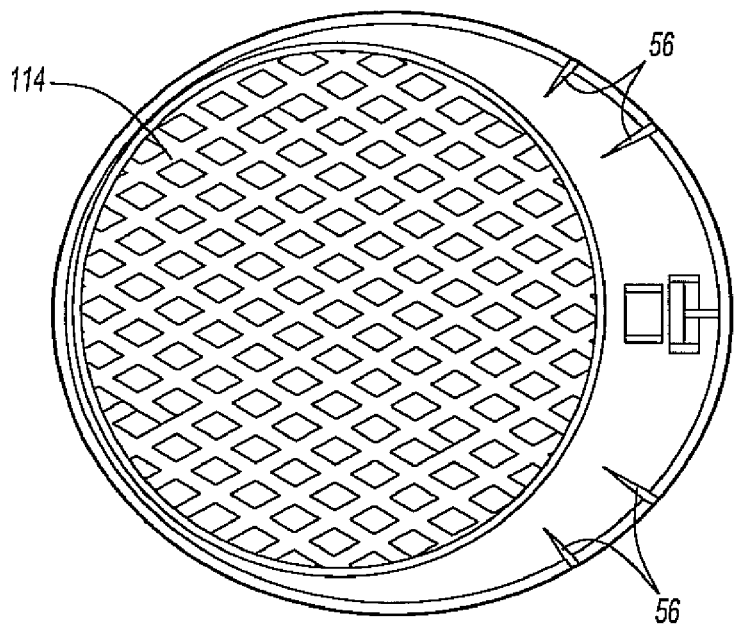
FIG. 9 is a front elevational view of the embodiment of FIGS. 1-5.

As shown in FIGS. 1, 3 and 5, a third detent is formed by a third pair of tabs 86, 88, which extend outwardly from the outer surface of the bezel wall 42. The third tabs 86, 88 include opposite and spaced apart locating edges 90, 102, respectively. As shown in FIG. 1, the third tabs 86, 88 are also spaced apart in a circumferential sense. Locating edge 102 of tab 88, engages the peripheral edge of the bumper wall 18 to constrain the bezel 40 in the longitudinal direction, so as to prevent the bezel 40 from moving outward relative to the bumper fascia 10. Tab 86 corresponds to aperture 94 disposed in the bumper wall 18, as seen in FIG. 10, and engages a peripheral edge of aperture 94 to contain the bezel 40 in the longitudinal direction, so as to prevent the bezel 40 from moving inward relative to the bumper fascia 10.

In summary, outward movement of the bezel 40 along its longitudinal central axis is constrained at 3 locations, by the tab 44 in its engagement with the peripheral edge of bumper wall 18, by the tab 64 in its engagement with the peripheral edge of bumper wall 18, and by the engagement of the tab 88 with the peripheral edge of bumper wall 18. Likewise, inward movement of the bezel 40 along its longitudinal central axis is constrained at 2 locations, by the tab 46 in its engagement with a peripheral edge of aperture 92 disposed in bumper wall 18, and by the tab 86 in its engagement with a peripheral edge of aperture 94 disposed in bumper wall 18. Further, movement of the bezel 40 in a direction substantially perpendicular to the longitudinal direction of the bezel is constrained by the tuning ribs 54 and 56.

As shown in FIGS. 6-9, at least one end wall 120 of the bumper wall 118 of the embodiment depicted herein is coupled to the bumper fascia 10 by a living hinge 122. The end wall 120 and living hinge 122 are integrally formed during molding of the bumper fascia 10. Both the mold and installed positions are indicated in these figures, with the mold position indicated by ghost lines. In assembly, the end wall 120 is bent about the hinge 122 from the mold position to the installed position. A bolt 124 or other threaded fastener is assembled through corresponding holes 126, 128 formed in the bezel wall 142 and the end wall 120, respectively, for securing the bezel 140 to the bumper fascia 10. This construction provides a mechanical fixation to the bezel/cover bezel. The feature of the embodiment of FIGS. 6-9 may be used in conjunction with the features of the embodiment of FIGS. 1-5 or independently thereof in which case the bumper fascia 10 will be provided with a living hinge 22 That is secured to an extension 20 of the bezel 40 by a bolt 24.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims.

The invention claimed is:

1. An assembly comprising, in combination:
   a molded bumper fascia having a wall defining an opening, said wall extending in a longitudinal direction relative to said bumper fascia;
   a bezel positioned in the opening and;
   a spaced pair of first tabs extending from said bezel, each of said first tabs having a locating edge;
   wherein said locating edge of one of said first tabs engages a distal edge of said wall to restrain the motion of said bezel in a first direction.

2. An assembly according to claim 1 and further comprising:
   at least one tuning rib formed integral with said bezel, said tuning rib positions said bezel, within said opening of said bumper fascia, in a direction substantially perpendicular to the longitudinal direction of said bezel.

3. An assembly according to claim 2 and further comprising:
   at least a circumferentially spaced pair of second tabs, each of said second tabs extending outwardly from said bezel and engaging the wall of said bumper fascia to prevent reverse relative motion of said bezel in a longitudinal direction relative to said bumper fascia.

4. An assembly according to claim 2 wherein:
   said bumper fascia has at least one living hinge molded integrally with said bumper fascia, said at least one living hinge being bent from a mold position to engage said bezel after the bezel is installed in the opening of said bumper fascia.

5. An assembly according to claim 4 and further comprising:
   at least one threaded fastener securing said bezel to said bumper fascia, said at least one threaded fastener fastened through aligned holes in said bumper fascia and said bezel.

6. An assembly comprising, in combination:
   a molded bumper fascia having a wall defining an opening therein, said wall extending in a longitudinal direction relative to said bumper fascia;
   a bezel adapted to contain a lamp therein, said bezel being positioned in said opening of said bumper fascia; and
   said bumper fascia having at least one living hinge molded integrally with said bumper fascia, said at least one living hinge being bent from a mold position to an installed position when said bezel is installed in the opening of said bumper fascia.

7. An assembly according to claim 6 and further comprising:
   at least one threaded fastener securing said bezel to said bumper fascia, said at least one threaded fastener fastened through aligned holes in said bumper fascia and said bezel.

8. An assembly according to claim 6 and further comprising:
   a circumferentially spaced and opposite pair of tabs, each of said tabs extending outwardly from said bezel and engaging the wall of said bumper fascia to prevent forward and reverse relative motion of said bezel in a longitudinal direction relative to said bumper fascia.

9. An assembly according to claim 1 wherein:
   said bezel is a cover for said opening.

10. An assembly according to claim 1 wherein:
    said wall includes a first aperture corresponding to the other one of said first tabs such that said locating edge of the other one of said first tabs engages a peripheral edge of said aperture to restrain the motion of said bezel in a direction generally opposite said first direction.

11. An assembly according to claim 3 wherein:
    said wall includes a second aperture corresponding to one of said second tabs such that said locating edge of one of said second tabs engages a peripheral edge of said aperture to restrain the motion of said bezel relative to said bumper fascia in a longitudinal direction of the opening of said bumper fascia.

12. An assembly according to claim 3 and further comprising:
    a third tab extending outwardly from said bezel and engaging said wall of said bumper fascia to restrain the motion of said bezel relative to said bumper fascia in a longitudinal direction of the opening of said bumper fascia.

* * * * *

UNITED STATES PATENT AND TRADEMARK OFFICE
CERTIFICATE OF CORRECTION

| | | |
|---|---|---|
| PATENT NO. | : 7,534,021 B2 | Page 1 of 1 |
| APPLICATION NO. | : 11/672273 | |
| DATED | : May 19, 2009 | |
| INVENTOR(S) | : Umesh Naik et al. | |

It is certified that error appears in the above-identified patent and that said Letters Patent is hereby corrected as shown below:

Column 1, line 48 replace "alone" with --along--

Column 1, line 14 replace "That" with --that--

Signed and Sealed this

Eighteenth Day of August, 2009

David J. Kappos
*Director of the United States Patent and Trademark Office*